Nov. 10, 1942.    L. RICEFIELD    2,301,659
COUPLING
Filed June 21, 1941    4 Sheets-Sheet 1

INVENTOR.
Louis Ricefield
BY Davis, Lindsey, Smith & Shonts,
ATTORNEYS.

Nov. 10, 1942.   L. RICEFIELD   2,301,659
COUPLING
Filed June 21, 1941   4 Sheets-Sheet 3

INVENTOR.
Louis Ricefield
BY Davis, Lindsey, Smith & Shonts,
ATTYS.

Nov. 10, 1942.  L. RICEFIELD  2,301,659
COUPLING
Filed June 21, 1941  4 Sheets-Sheet 4

INVENTOR.
Louis Ricefield
BY Davis, Lindsey, Smith & Shonts,
ATTYS.

Patented Nov. 10, 1942

2,301,659

UNITED STATES PATENT OFFICE 2,301,659

COUPLING

Louis Ricefield, Oak Park, Ill.

Application June 21, 1941, Serial No. 399,154

9 Claims. (Cl. 64—14)

This invention relates to improvements in couplings and the like and its purpose is to provide improved means for transmitting forces between movable parts, such as coupling members secured upon substantially aligned shafts. The present application is a continuation in part of my co-pending application Serial No. 325,324, filed March 22, 1940.

The invention is of particular advantage when embodied in couplings of the type disclosed in my prior United States Patents No. 2,025,824, No. 2,025,825, No. 2,025,826, No. 2,025,827, No. 2,025,828 and No. 2,025,829, all dated December 31, 1935, which are adapted to compensate for relative lateral displacement and angular misalignment, and to permit relative endwise movement, of substantially aligned shafts. In these prior patents there are disclosed various forms of couplings, each of which, generally speaking, comprises a pair of coupling members each secured upon one of two substantially aligned shafts, each coupling member having a plurality of longitudinally extending jaws which intermesh loosely with each other and contact with interposed resilient deformable power transmitting members through which forces are transmitted from one coupling member to the other. The power transmitting members may be formed as the arms of a spider or they may be constructed as separate members which are held against radial displacement by retaining devices. These power transmitting members, as heretofore used, have usually been formed of rubber, leather, laminated fabric bodies impregnated with rubber, or of other materials having appreciable resiliency and deformability and capable of being flattened and distorted when subject to compressive stresses or other stresses imparted thereto when the coupling is in use. When transmitting substantially uniform power, power transmitting members of this type will render satisfactory service even after a considerable reduction of their thickness has been brought about either by wear or by a partial permanent deformation, but if this power is greatly fluctuating in extent and frequency, the power transmitting members, even though they be initially satisfactory, will rapidly lose their ability to cushion the shocks of the fluctuations and to eliminate their effect upon the connected machinery.

When the force transmitted through connected shafts is repeatedly and suddenly applied, as in the operation of Diesel engines, for example, this force unless cushioned will create elastic deformation and thereby often excessive vibration in the connected shafts. To effect this cushioning action, an elastically yielding connection must be made between the engine shaft and the shaft of the driven machine which will permit relative torsional displacement between them, proportional to the power transmitted. In order that the connection may continue to be satisfactory, the yielding of the connection and the deformability of the power transmitting members, in case the connection is made by a coupling of the type referred to, must remain a fixed function of the power transmitted for a long period of service life.

Where the couplings are equipped with power transmitting members of the types referred to above, their material evidences the following behavior after extended service:

When made of leather and transmitting fluctuating power, a permanent deformation begins to develop in the power transmitting members from the very beginning of service, the rapidity and extent of which deformation depends not only upon the amount of maximum pressure applied to them but also, and to a greater extent, upon the frequency of its application. This permanent deformation is coincident with an increase in the density of the fibrous structure of leather which becomes hard and gradually loses its resilient deformability under all but the greatest power impulses of a fluctuating load, thereby setting up very objectionable vibrations in the connected shafts. If the power transmitted is uniform, however, the power transmitting members only have to compensate for misalignment of the shafts but do not need to alter the elastic torsional deflection in the shafts, and they do not require any more resilient deformability than is needed to compensate for misalignment. Thus, while couplings equipped with power transmitting members made of leather are very economical in size and cost, when transmitting uniform power, they are either objectionable or at best very costly in transmitting fluctuating power, because, in order to retard the hardening process of the leather, the power transmitting surfaces have to be greatly enlarged to reduce the pressure applied to leather, which in turn entails an enlargement of the coupling, often beyond the dimensions, weight, flywheel-effect and cost permissible.

When made of rubber, the power transmitting members, if subjected to sufficiently low pressures, will yield fairly satisfactory service in eliminating vibration due to fluctuating-power, until surface friction on the jaw surfaces will have reduced their thickness and therefore their specific deformability to a point where they are unable to affect the elastic torsional deflection of the connected shafts. If the specific pressure on rubber be held to a very low value, the couplings become very large and costly.

In order to increase the specific pressure applicable to the power transmitting members, and thereby reduce the dimensions of the couplings, rubber is now being used in laminations bonded between laminations of fabric, possessing greater resistance to abrasion by friction on the jaw surfaces than rubber, while possessing a slight amount of resilient deformability. Power transmitting members made of such laminations of rubber and fabric, bonded together into integral bodies, may safely be subjected to greater pressure under a uniform power than rubber alone could be, but if the transmitted power is fluctuating, a disintegration develops in the fabric laminations, until all fabric will have disappeared between the rubber laminations at the outer ends of the power transmitting members where the relative torsional movement of the jaw faces is the greatest. From that point on, the rubber laminations begin to tear of, bringing about the complete destruction of the power transmitting members, often before the outer laminations of fabric have been at all affected by surface friction on the jaw faces. This failure of the rubber laminations occurs at fluctuating loads even if the maximum of these loads is less than that applicable to solid rubber bodies. Thus, this form of power transmitting member also requires low specific pressure and therefore large coupling dimensions.

In some other types of couplings, wherein the desirable qualities of rubber for the transmission of fluctuating power are utilized, the power transmitting members, made of rubber, are freed from the destructive effect of surface friction on their faces which contact with the coacting jaws of the coupling bodies, either by being directly bonded to these jaw faces or by being secured thereto indirectly, such as by riveting or dovetailing structurally strong cover plates bonded to the power transmitting surfaces of the rubber members. Power transmitting members of this construction, however, also fail to yield a sufficiently long service life in proportion to the power transmitted.

All of these forms, in contrast with those first discussed, eliminate relative movement between the power transmitting members and the coacting coupling jaws, by anchoring the shafts to each other longitudinally of their axis.

Since, however, angular misalignment of the shafts always requires a certain amount of longitudinal displacement of the jaws, and certain types of machinery such as electric generators often require free endwise movement of their shafts, in all couplings so anchoring the shafts to each other, the rubber portions of the power transmitting members are subjected to shear on their fixed contact surfaces while resisting the efforts of the shafts to oscillate longitudinally with respect to each other. Thus, while eliminating surface friction, this construction introduces fluctuating shearing stresses which, in addition to being destructive to rubber because of internal heat they generate, also impede a very essential function of misaligned shafts, namely, their free longitudinal adjustment during rotation.

Whereas, under uniform load, the power transmitting members, once deformed thereby, will only be subject to such additional deformation as the shafts may require for the compensation of their misalignment under fluctuating power, on the other hand, the power transmitting members must undergo, in addition to the above, a continuous process of deformation, varying in extent and frequency with the power transmitted.

This process of deformation is accompanied by a corresponding labor of friction between the parts composing the deformable portion of the power transmitting members, and by recurrent elongation and contraction of these parts in directions transverse to the transmitted power. While this internal labor of deformation, because of its destructiveness, is in itself accelerating a reduction in thickness of the power transmitting members, its effect is additionally detrimental to that capacity required of them when transmitting fluctuating power, which is that their deformability shall be a fixed function of the power transmitted. Since any permanent reduction in thickness reduces the deformability of a given material, power transmitting members subjected to such reduction will very rapidly fail to eliminate vibration, even while still capable of compensating for a misalignment of the shafts while transmitting power.

The present invention has for its purpose to provide power transmitting members which will retain their deformability as a substantially fixed function of the deforming force, regardless of the extent and frequency of variations of this force.

This is accomplished by the elimination of friction on the outer surfaces of the deformable parts of the power transmitting members, and particularly by a reduction of the internal labor of deformation to a value within the capacity of the material forming the deformable parts.

More particularly, the present invention involves the discovery that compressive stresses may be more efficiently transmitted in couplings and other devices by a new form of power transmitting member made up of a plurality of laminations bonded together and formed of different materials, some of which are resiliently deformable while others are hard and substantially inable while others are hard and substantially incompressible or non-deformable. The resilient deformable laminations may be formed of rubber, or other like materials, and the substantially incompressible and nondeformable laminations, while not strictly having these characteristics to the last degree, are structurally strong and may be formed of such materials as hard rubber, spring steel or layers of cotton fabric impregnated with a synthetic resin such as Textolite and other like materials capable of being bonded over their entire contacting surfaces with the adjacent deformable laminations, anchoring these into a fixed relationship, and being strong enough to retain their capacity of anchoring the deformable laminations throughout their entire power transmitting surfaces. The hard and substantially incompressible laminations may be the outer laminations, one face of which contacts directly with the jaws of the coupling members where they perform the function of withstanding frictional wear under relative sliding movements, while at the other face anchoring the intermediate resilient and deformable laminations which not only transmit the load but permit such distortion of the power transmitting member as may be necessary to compensate for misalignment of the shafts and to absorb the shocks incident to fluctuating loads.

In a laminated construction of the type just referred to, the resilient deformable laminations act as columns extending in the directions which forces are transmitted and, since their end surfaces are bonded over their entire areas to the hard or substantially incompressible laminations, their lateral buckling is greatly reduced and limited as compared with what it would be if the ends of these columns were free; in other words, if the laminations were loosely assembled. The failure of such a column is caused not only by the shearing stresses set up therein due to compression but, also, by the tensile stresses in the outer fibers of the column arising from the buckling action, and these tensile stresses may greatly exceed the shearing stresses as soon as the buckling becomes appreciable. By limiting the buckling action through the fixing of the end surfaces of the column, or by superimposing a plurality of short columns fixed at their ends, the present invention brings about a reduction in the internal stresses in the resilient deformable laminations and a consequent increase in the life of the power transmitting member without thereby reducing the torsional resiliency required of the coupling. The hard or substantially incompressible laminations thus perform the function of anchoring the ends of the intermediate deformable laminations and, also, when the hard laminations contact directly with the jaw faces, the function of limiting the frictional wear upon relative movement of the jaws and the power transmitting members. Since the main function of the hard laminations is to provide an anchorage for the deformable laminations, it is therefore important that they should be strong enough to withstand shearing stresses in planes parallel to their bonding surfaces. While steel or other metals possess both the strength and the capacity for strongly bonding to rubber, their coefficient of friction without a lubricant would be very high in contact with the jaw faces. For that reason it is considered preferable to use hard laminations formed of fabric layers impregnated with a synthetic resin. Hard laminations formed of such materials not only possess the above qualities but can be made to have a very low coefficient of friction and, in addition, have certain natural vibration characteristics which are preferable to those of metals.

Having thus greatly reduced the tensile stresses due to buckling, as well as surface friction on the rubber which is basically relied upon for the resilient transmission of power, this construction permits the application of a compressive force nearer to the capacity of rubber for static compression, and thus greatly increases the dynamic load applicable, without thereby affecting the requisite functions of the coupling.

If the power transmitting members are of such thickness as to be equal to or less than the gap between adjacent opposed jaw faces, the outer laminations of the power transmitting members may preferably be formed as thin layers of resilient compressible material, such as rubber, particularly when a reversing load is being transmitted. Under those conditions, the power transmitting members are reduced in thickness under the influence of the load transmitted so that gaps are produced between the inactive faces of the jaws and the power transmitting members and these gaps are closed upon reduction or reversal of load, thereby producing an objectionable slapping noise except for the presence of the outer cushioning laminations of resilient deformable material.

When the coupling of the present invention is used under a fluctuating load and it is desirable to intercept power impulses uninterruptedly, further advantages may be gained by putting the power transmitting members under initial compression when they are placed between the jaw faces of the coupling members. Since the extent of reduction under compression of the laminations of deformable material is a function of its thickness and of the ratio of this dimension to the dimension transverse thereto, any reduction of the thickness from which deformation begins under minimum value of the pressure applied will reduce the extent and thus the internal labor of deformation between the minimum and the maximum value. Since the deformability of such materials also generally reduces with increasing pressure, it follows that if the power transmitting members are put under initial compression, when there is no load on the coupling, the extent of their deformation under the maximum load, and thus the internal labor of their deformation, will be less than it would be if they were continuously deformed from a free unloaded state. An added advantage of this pre-compression is also in the assurance that the power will always flow from one shaft to the other through a resilient medium, regardless of its direction or magnitude.

This initial compression is made possible by forming the power transmitting member of a greater normal thickness than the normal distance between the opposed jaw faces, so that the member may be wedged into place between the jaws and thus put under initial compression, when there is no load on the coupling, with a resultant increase in the life of the member. A power transmitting member of this type may be readily put in place and may be constructed to cause all of the forces to be transmitted to the hard incompressible parts of the member after a predetermined deformation of the deformable parts of the member. In addition to increasing the life of the coupling, the present invention has the advantage of improving the efficiency of other machines or machine elements to which the coupling or other device may be connected by reason of the reduction or substantial elimination of vibrations through the damping of these vibrations in the parts of the power transmitting member or members.

Other objects and features of the invention will appear more fully hereinafter.

The nature of the invention will be understood from the following specification taken with the accompanying drawings in which several embodiments of the invention, as applied to couplings, are illustrated. In the drawings.

In Figs. 1 to 5, inclusive, the invention is shown as being embodied in a coupling comprising two metal coupling members 15 and 16 which are adapted to be secured upon substantially aligned shafts 17 and 18, respectively, by means of keys 19. The coupling member 15 has a hub portion 15a which is secured upon the shaft and a radially extending disk 15b provided with a plurality of longitudinally extending jaws 15c which are adapted to intermesh loosely with a plurality of other similar longitudinally extending jaws 16c which extend longitudinally from the disk 16b carried by the hub portion 16a of the other coupling member. These longitudinally extending jaws 15c and 16c are spaced apart to receive between them the power transmitting members 20 which are in the form of blocks of substantially rectangular cross section made up of a central lamination 20a and side laminations 20b. The laminations 20b are provided with outer faces 20c which are adapted to contact with the faces 15d and 16d of the jaws carried by opposite coupling members. In the construction illustrated, the faces 20c on each block are parallel to each other and the faces 15d and 16d carried by two opposed jaws are also parallel to each other.

Figure 1:
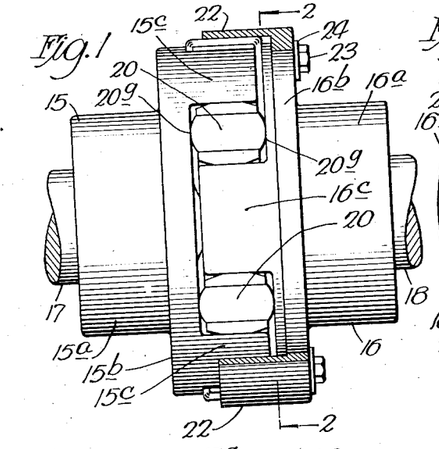
Figure 1 shows a side elevation of one form of coupling embodying the features of the present invention where the power transmitting members are subjected to an initial compression when they are interposed between the jaws of the coupling members, a part of the annular retaining member of this device being broken away.
Figure 2:
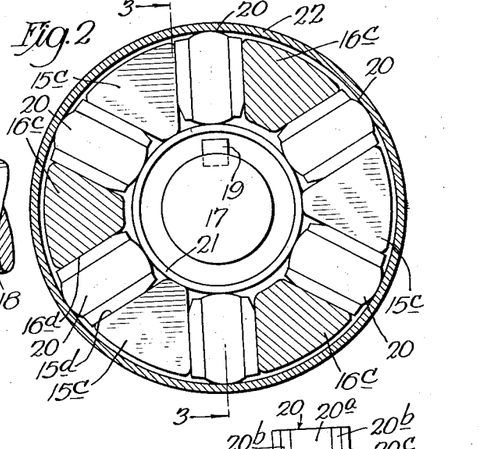
Fig. 2 shows a sectional view taken on the line 2—2 of Fig. 1.
Figures 3, 4, 5, 6:
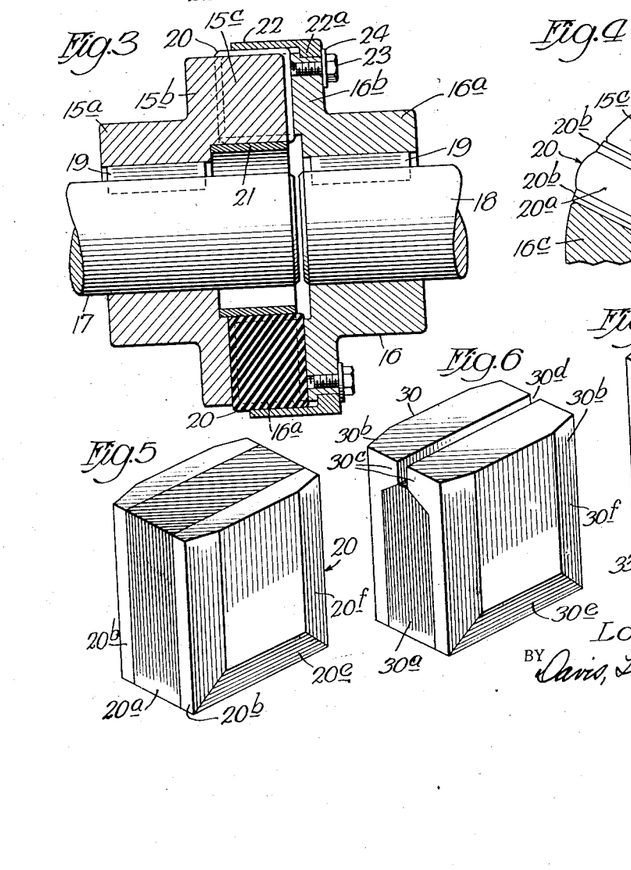
Fig. 3 shows a sectional view taken on the line 3—3 of Fig. 2.
Fig. 4 is an enlarged partial sectional view, similar to that of Fig. 2, showing one of the power transmitting members removed and in position to be driven into wedging engagement with two opposed jaw faces.
Fig. 5 is a perspective view of one of the power transmitting members embodied in the form of construction shown in Figs. 1 to 4, inclusive.
Fig. 6 is a perspective view of another form of power transmitting member which is adapted to have a predetermined limited deformation.

The coupling member 15a has secured to the hub portion thereof a longitudinally extending extension 21 which is adapted to be engaged by the inner end faces 20d of the power transmitting members 20 for preventing radial inward displacement thereof. These members 20 are prevented from moving radially outward by an annular retaining ring 22 which is provided at one edge with an enlargement 22a seated in an annular recess formed in the disk 16b of the other coupling member and secured in place by a series of studs 23 which engage threaded apertures in the disk 16b and which secure in place a series of washers 24 which overlie the part 22a of the retaining ring. By this construction, the power transmitting members 20 are retained in place and the two coupling members 15 and 16 are permitted to have relative movement to compensate for angular misalignment and relative lateral displacement of the two shafts 17 and 18 and also to allow for relative endwise movement of these shafts.

The power transmitting members 20 embody the improvements of the present invention which consist in making the central lamination 20a of resilient deformable material such as rubber or other like materials capable of being distorted and deformed and having the faculty of returning to their initial shapes when released, while forming the other outer laminations 20b of hard and substantially incompressible material. It is now preferred to form the laminations 20b of layers of cotton fabric or the like which are cemented together by and impregnated with a bonding material such as a synthetic resin, several of which are on the market, two of them being known under the trade names of "Micarta" and "Textolite." When the layers of fabrics are bonded together under compression and the resulting product hardens, it is very hard and substantially incompressible and the outer surfaces are quite smooth so that they offer little frictional resistance to the parts with which they contact. The layers of fabric employed in the formation of the laminations 20b are preferably so arranged that they are parallel to the surfaces 20c and the laminations formed of the materials just referred to, or their equivalents, have the faculty that they may be secured by vulcanization to the intermediate lamination 20a formed of rubber or the like, the bond being as strong as the rubber itself, while the bond between the layers of fabric embodied in the hard laminations is great and the structure of the layers of fabric so strong as to withstand any shearing stresses in the direction of these layers, as well as any loosening of the bond between the fibers comprising the layers, under any fluctuations of forces which a fluctuating power may produce. The laminations 20a and 20b may thus be secured together to form a unitary body which is substantially indestructible except after long-continued use. In forming a power transmitting member 20, it is preferably so constructed that its opposite faces 20c are spaced apart a greater distance than the normal distance between the opposed faces 15c and 16c of two coupling jaws which are to be engaged by these opposed faces of the member 20 when it is put in place and the inner portions of the opposite faces 20c of the member are tapered, as shown at 20e, so that they converge inwardly and their inner portions may be projected between the opposite jaw faces 15c and 16c, as shown in Fig. 4. The member 20 may then be driven into place between the opposite jaw faces by the use of a hammer or the like, thus wedging the member 20 into its operating position and causing an initial deformation of the intermediate lamination 20a so that the parts of each member 20 are under compression even when there is no load on the coupling. In assembling the parts of the coupling, the two coupling members 15 and 16 are first put together with their jaws intermeshing loosely with each other and with the annular retaining ring 22 removed and then, after driving the member 20 into place, the ring 22 may be attached to the coupling member 16.

By means of the foregoing construction, it will be apparent that a power transmitting member 20 is provided having hard and substantially smooth opposed faces 20c which permits it to be driven into place between the jaw faces, in the manner shown in Fig. 4, which is an operation not capable of being carried out with power transmitting members formed of rubber or other similar resilient and deformable materials. The laminations 20b are substantially hard and incompressible so that they may be driven with a hammer without injury and when they are in place they provide hard wear-resisting surfaces engaging the jaw faces 15c and 16c. The wear-resisting faces 20c of these members, in addition to being tapered at their inner ends, may also be beveled at their opposite downwardly extending edges to facilitate their insertion, as shown at 20f in Figs. 1 to 5. It has been found that the life of power transmitting members of this form is greatly increased by this initial compression of the intermediate lamination and by the transfer of surface friction from the deformable parts to the wear-resisting outer laminations of the power transmitting member. In addition, the vibration in connected mechanisms is greatly reduced by employing a power transmitting member which, because of its composite construction, can be provided with such natural frequency of deformation as the transmitted power requires and can retain this virtually unimpaired by surface friction and by internal labor of deformation, while sustaining a heavier load than would be possible if rubber were used alone throughout the entire bodies of the power transmitting members.

In Fig. 6 of the drawings there is shown a modified form of power transmitting member 30 which may be employed in conjunction with the other features of coupling construction illustrated in Figs. 1 to 5, inclusive. The power transmitting member 30 comprises an intermediate layer 30a formed of rubber or the like, this intermediate layer being united, preferably, by vulcanization with two outer laminations 30b which are formed of hard and substantially incompressible material, such as layers of cotton fabric impregnated with a synthetic resin or the like as described above, and secured together under pressure to form a hard, wear-resisting body. In this form, the outer layers 30b are provided at their outer edges with inwardly extending flanges 30c spaced apart, in the normal condition of the member 30, by a gap 30d. The outer layers 30b are beveled around their inner edges as shown at 30e and also along their outer lateral edges as shown at 30f, for the purpose heretofore described in connection with the power transmitting member 20. With the form of construction shown in Fig. 6, the flanges 30c at the outer margins of the hard laminations 30b are adapted to engage each other after a predetermined compression and distortion of the intermediate layer 30a, whereupon the forces being transmitted are transmitted directly from one outer lamination 30b to the other lamination 30b without further compression or distortion of the intermediate layer 30a.

Figure 7:
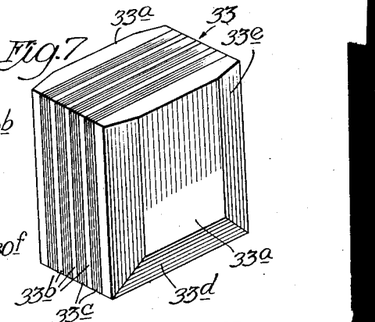
Fig. 7 is a perspective view of still another form of power transmitting member which is made up of a considerable number of relatively thin laminations.

In Fig. 7 of the drawings, there is shown still another form of power transmitting member 33 comprising a considerable number of laminations including two outer laminations 33a formed preferably of layers of cotton fabric cemented together by and impregnated with a synthetic resin or the like to form hard, substantially incompressible bodies, and a plurality of intermediate laminations 33b and 33c which are secured to each other and to the laminations 33a by vulcanization or the like. The laminations 33c are formed preferably of rubber and the laminations 33b may be formed of spring steel or of the same material as the laminations 33a, all possessing the quality of providing an indestructibly fixed anchorage for the laminations 33b. The outer laminations 33a are beveled at their inner edges as shown at 33d and also at their lateral edges as shown at 33e to facilitate the driving of the power transmitting members between the jaws of opposed coupling members such as shown in Figs. 1 to 5, inclusive.

In Figs. 8, 9, 10 and 11 of the drawings, there is illustrated a modified form of the invention comprising two coupling members 35 and 36 which are secured to a pair of substantially aligned shafts 37 and 38, respectively, by means of keys 39. These coupling members have hub portions 35a and 36a, respectively, which are formed integrally with radially extending disks 35b and 36b provided with integral longitudinally extending jaws 35c and 36c, respectively. These jaws intermesh loosely with each other and are adapted to receive between them power transmitting members 40c which are formed as the radiating arms of a power transmitting spider 40. The intermediate portions 40b of the spider arms 40c are formed of rubber or the like and they are united with the corresponding parts of adjacent arms 40c by outer laminations 40d which are vulcanized or otherwise secured to intermediate laminations 40b so that the adjacent arms 40c are connected with each other by this continuous integral member extending between adjacent spider arms, the intermediate connecting portions 40e of these outer laminations extending between the inner ends of adjacent parts 40d.

In the embodiment illustrated, the arms 40c are constructed so that they increase gradually in thickness, measured circumferentially of the spider, from their inner ends outwardly, and they may be so proportioned as to cause substantially uniform compressive stresses to be set up in all parts of the spider arm when the coupling is under load, as explained in certain of my prior patents above mentioned, but the laminated type of construction illustrated may also be utilized for limiting the deformation of the spider arms after a predetermined load has been put upon the coupling. This is accomplished by forming the outer laminations 40$^d$ of the spider arm of hard and substantially incompressible materials such as layers of fabric united with each other and impregnated with a synthetic resin or other equivalent material which provides a lamination having great wear-resisting qualities and the advantage that it may be united with the intervening layer 40$^b$ of rubber or the like by vulcanization, so that a unitary spider arm construction is provided. When thus formed, the effect of a load being transmitted to the coupling from the jaws of one coupling member to the jaws of the other coupling member is to deform the intermediate laminations 40$^b$ of the spider arm and to force the materials of these layers outwardly, as shown in Fig. 11, until the outer hard layers 40$^d$ of the power transmitting surfaces of the spider arms are substantially in contact with each other, thus preventing any further substantial compression of the spider arms, which is an advantage under many conditions of use.

Figure 8:
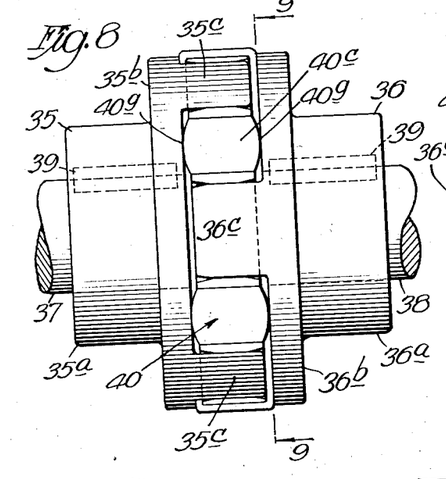
Fig. 8 shows a side elevation of another form of coupling embodying the features of the present invention where the power transmitting members are subject to an initial compression when they are placed in position between the jaws of the coupling members.
Figure 9:
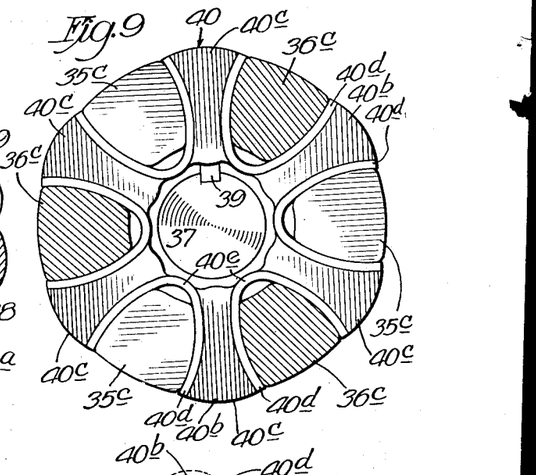
Fig. 9 shows a sectional view taken on the line 9—9 of Fig. 8.
Figures 10, 11, 11A:
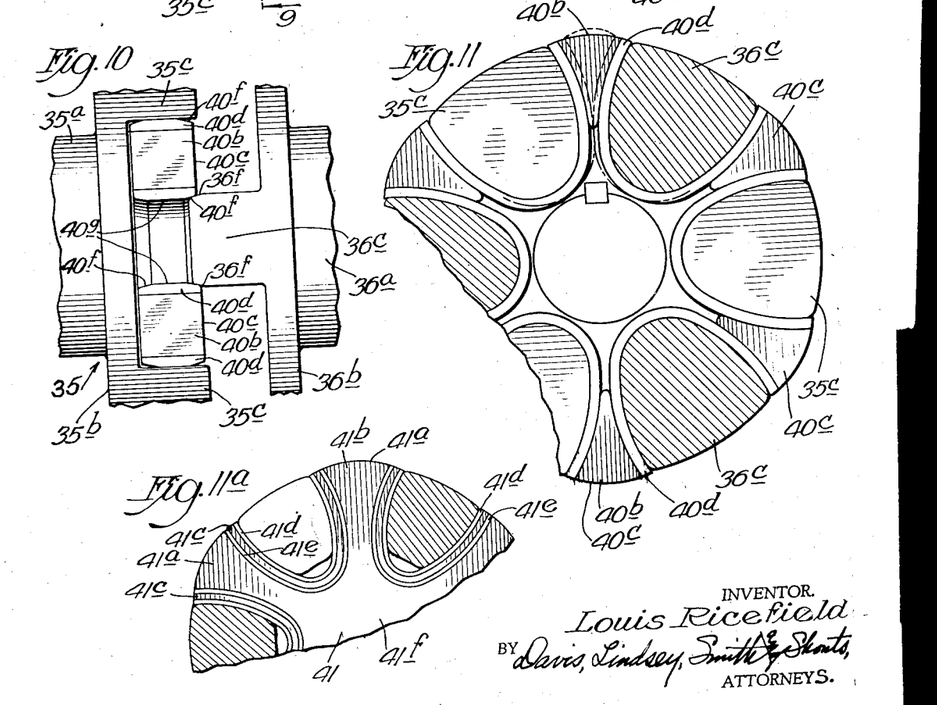
Fig. 10 is a partial side elevation of the coupling shown in Figs. 8 and 9, illustrating the method of assembly of the device.
Fig. 11 is a partial enlarged sectional view similar to that of Fig. 9, showing a spider similar to that of Fig. 9 but adapted to have a predetermined limited deformation.
Fig. 11a is a partial sectional view, similar to that of Fig. 11, showing a modified form of construction in which a greater number of laminations are embodied in the construction of each spider arm.

In Fig. 10, there is shown the method of assembly of the form of coupling shown in Figs. 8, 9 and 11. As there illustrated, the outer laminations 40$^d$ of the spider arms are beveled in a general radial direction as shown at 40$^f$, thus decreasing the width of the surfaces 40$^g$ which contact with the faces of the jaws 35$^c$ and 36$^c$, the latter faces being constructed to conform substantially to the curvature of the faces of the laminations 40$^d$. The jaws 36$^c$ of one coupling member have their lateral faces beveled also, as shown at 36$^f$, and the construction is such that after the spider has been put in place in one coupling member 35, as shown in Fig. 10, the spaced faces of two opposite spider arms are then closer together than the distance between the opposite faces of one jaw 36$^c$ carried by the other coupling member, so that when the last-mentioned coupling member 36 is moved endwise it is necessary to wedge the jaws 36$^c$ between the faces 40$^g$ of the spider arms, thus setting up an initial compression in the intermediate laminations 40$^b$ which may cause them to be deformed and to bow outwardly toward the disks 35$^b$ and 36$^b$ of the coupling members, as shown at 40$^g$ in Fig. 8.

In Fig. 11$^a$ of the drawings there is shown a modified form of spider adapted to be used with the coupling members shown in Figs. 8, 9, 10 and 11. In this modified form, the spider arms are formed of a plurality of laminations of rubber combined with a plurality of other laminations which are substantially incompressible or non-deformable, thus illustrating the possibility of obtaining in a spider, as well as in individual power transmitting members, various degrees of strength and deformability by varying the number, thickness, resiliency and deformability of the laminations. In this form, the spider 41 comprises a plurality of radiating arms 41$^a$ each made up of a central lamination 41$^b$ and two other laminations 41$^c$, formed of rubber, which are bonded over their contacting surfaces with other laminations 41$^d$ and 41$^e$ formed of hard material of the kind previously referred to. The laminations 41$^b$ are formed as projections on the central hub portion 41$^f$ and the laminations 41$^d$ and 41$^e$ are continuous between adjacent spider arms as in the form just described.

Figures 12, 13, 14, 15, 16:
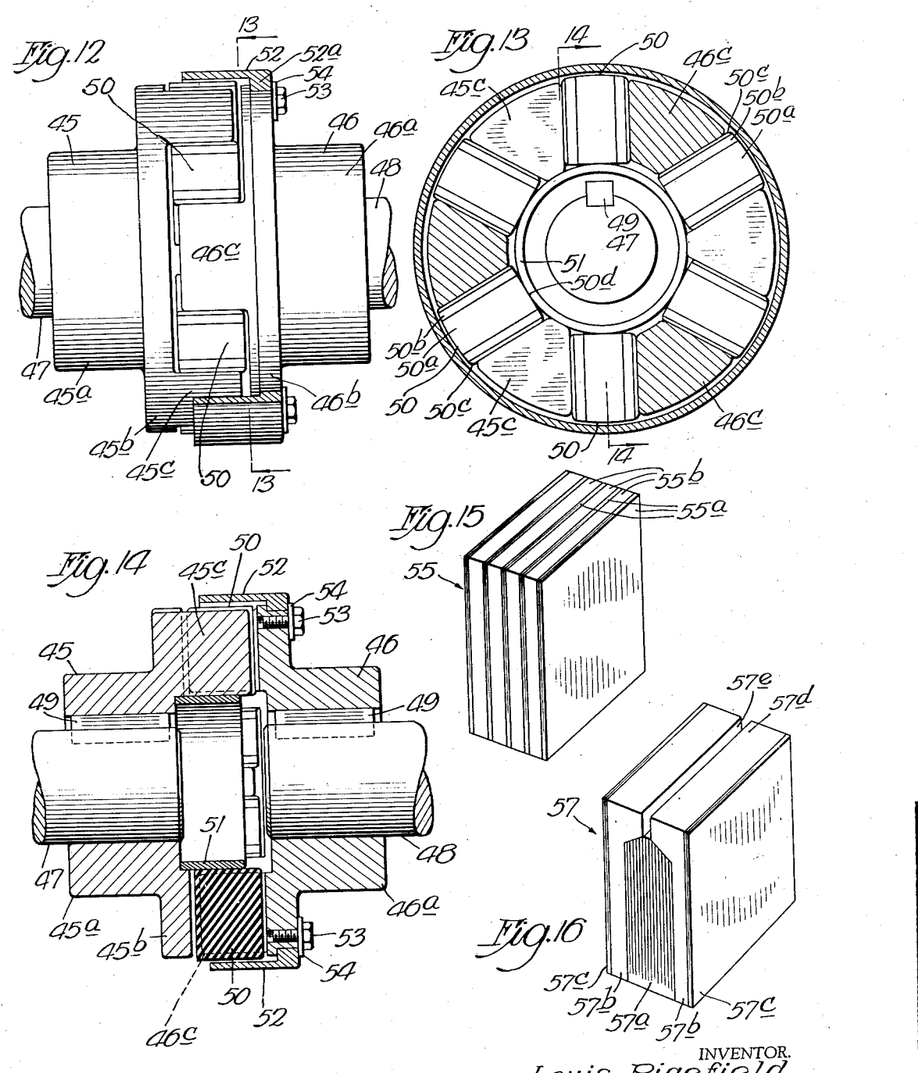
Fig. 12 shows a side elevation of another form of coupling embodying the features of the present invention where the power transmitting members are capable of being inserted freely between the jaws of the opposite coupling members without any initial compression, the power transmitting members being provided on their outer jaw-engaging faces with laminations of resilient deformable material.
Fig. 13 shows a sectional view taken on the line 13—13 of Fig. 12.
Fig. 14 shows a sectional view taken on the line 14—14 of Fig. 13.
Fig. 15 shows a perspective view of a modified form of power transmitting member adapted to be used in the form of construction shown in Figs. 12 to 14, inclusive, where the outer layers of the power transmitting member are formed of resilient deformable material.
Fig. 16 is a perspective view of another form of power transmitting member adapted to be used with the form of construction illustrated in Figs. 12 to 14, inclusive, where the extent of compression of the power transmitting member is limited by the engagement of laminations which are hard and substantially incompressible.

In Figs. 12, 13 and 14 of the drawings, there is illustrated a modification of the invention which is generally similar to the form shown in Figs. 1 to 5, inclusive, except that the parts are so proportioned that the power transmitting members are not under compression when there is no load on the coupling and that these members are provided on their outer sides with comparatively thin layers of resilient deformable material which contact directly with the faces of the jaws. In this modified form, the coupling comprises two metal coupling members 45 and 46 which are secured upon substantially aligned shafts 47 and 48, respectively, by means of keys 49. The coupling member 45 comprises a hub portion 45$^a$ secured upon the shaft and a radially extending disk portion 45$^b$ which is provided with a plurality of longitudinally extending jaws 45$^c$ adapted to intermesh loosely with a plurality of other similar longitudinally extending jaws 46$^c$ extending longitudinally from the disk portion 46$^b$ which is carried by the hub portion 46$^a$ of the other coupling member. These longitudinally extending jaws 45$^c$ and 46$^c$ are spaced apart to receive between them the power transmitting members 50 which are in the form of blocks of substantially rectangular cross section, each made up of a plurality of laminations including a central lamination 50$^a$, two intermediate laminations 50$^c$. The intermediate two outer laminations 50$^a$ of each power transmitting member 50 is formed of resilient deformable material such as rubber or the like, and the two intermediate laminations 50$^b$ are formed preferably of layers of fabric secured together by and impregnated with a synthetic resin or the like so that they are hard and substantially incompressible, thereby forming anchoring bases for the contacting faces of the intermediate lamination 50$^a$ which is bonded thereto over the entire areas of these faces. The outer laminations 50$^c$ are comparatively thin and are formed preferably of rubber or the like so that they have a cushioning effect and are adapted to prevent undesirable noise when the coupling is used with a reversing or fluctuating load, under which conditions the gaps between certain faces of the power transmitting members and certain faces of the jaws are periodically closed up during the reversal of the load. In the embodiment illustrated, the jaw engaging faces of the outer laminations 50$^c$ of each power transmitting member are parallel to each other and the jaw faces which are engaged thereby also have a parallel relationship.

As in the form of the invention first described, the coupling member 45 has secured to the hub portion thereof a longitudinal extension 51 which is adapted to be engaged by the inner end faces 50$^d$ of the power transmitting members for preventing radial inward displacement thereof. The members 50 are prevented from moving radially outward by an annular retaining ring 52 which is provided at one edge with an annular enlargement 52$^a$ seated in an annular recess formed in the disk portion 46$^b$ of the coupling member 46. This annular ring is secured in place by a series of washers 54 which overlie the part 52$^a$ of the retaining ring and which are held in place by studs 53 which engage threaded apertures in the disk portion of the coupling member. In this way, the power transmitting members 50 are retained in place and are permitted to have relative movement with respect to the coupling members to compensate for angular misalignment and relative lateral displacement of the two shafts 47 and 48 and also to allow for relative endwise movement of these shafts.

In this form of the invention, the thickness of the power transmitting members, measured in the direction in which forces are transmitted, is the same or it may be less than the spaced relationship of the faces of two opposed jaws carried by opposite coupling members when there is no load on the coupling, so that the power transmitting members are not under compression when the coupling is not under load. In this form, however, the primary advantage of the present invention is obtained since the laminations 50a act as columns which are anchored at their ends and are thereby limited in their buckling action when these intermediate laminations are distorted by the adjustment of the parts of the coupling to misalignment of the shafts, so that they are capable of carrying a heavier load than they could if they were formed entirely of rubber. The outer laminations 50c, while tending somewhat to hamper the free sliding movement of the power transmitting members upon the jaw faces during relative endwise movement of the shafts, have the advantage that they eliminate noise and have a sufficiently long life to perform this function even after parts thereof have been worn away by frictional contact with the jaw faces.

In Fig. 15 of the drawings, there is shown a modified form of power transmitting member 55 which may be substituted for the power transmitting members 50 in the embodiment shown in Figs. 12 to 14, inclusive. The power transmitting member 55 comprises a plurality of layers 55a which are formed of resilient deformable material such as rubber or the like, and these laminations are arranged alternately with a plurality of other laminations 55b which are hard and relatively incompressible and which are preferably formed in the manner heretofore described, that is, by cementing together and impregnating a plurality of layers of cotton fabric with a bonding material such as a synthetic resin of the character heretofore described. Or the outermost laminations 55b may be formed in the manner just described and the inner ones may be formed of steel. Due to the limited thickness of the power transmitting member 55, measured in the direction of which forces are transmitted, the total compressibility or deformability of this power transmitting member under load is limited as compared with the form shown in Figs. 12 to 14, inclusive, but due to the reduction of buckling stresses of the resilient deformable laminations by a reduction of their thickness, their load carrying capacity will be greatly increased.

In Fig. 16 of the drawings, there is shown still another form of power transmitting member 57 which is generally similar to the form shown in Fig. 6, except that it is provided on its outer sides with thin laminations of resilient deformable material which are adapted to contact directly with the jaw faces. This form also is adapted primarily for use in the modification of the form of the invention illustrated in Figs. 12 to 14, inclusive, and it comprises a central lamination 57a, two intermediate laminations 57b, and two outer laminations 57c. The intermediate lamination 57a is formed of resilient deformable material such as rubber, and the laminations 57b are comparatively hard and incompressible and are preferably formed of layers of fabric impregnated with a synthetic resin. The outer laminations 57c are preferably formed of rubber or the like so that they have a cushioning effect when the coupling is operated under a fluctuating load and all of the laminations are bonded together over the entire areas of their contacting faces. Inasmuch as this power transmitting member is adapted to be inserted freely between opposite jaw faces without being under initial compression when there is no load on the coupling, the outer faces of the laminations 57c may be parallel to each other over their entire areas. The intermediate laminations 57b are provided with inwardly projecting flanges or shoulders 57d which are normally spaced apart to leave a gap 57e between them but when there is a load on the coupling these shoulders are adapted to contact with each other after a predetermined compression of the central lamination 57a, thus limiting further compression of the power transmitting member except for such compression as may be imparted to the outer resilient deformable laminations 57c.

Figure 17:
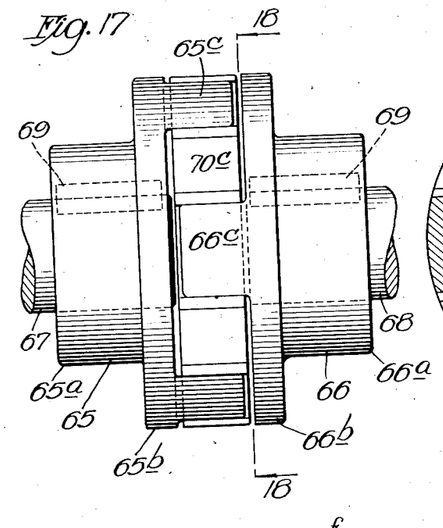
Fig. 17 is a side elevation, similar to that of Fig. 8, showing another form of the invention wherein the power transmitting members are formed as the arms of a spider and where these arms are not subjected to initial compression when they are placed between the jaws of the coupling members.
Figure 18:
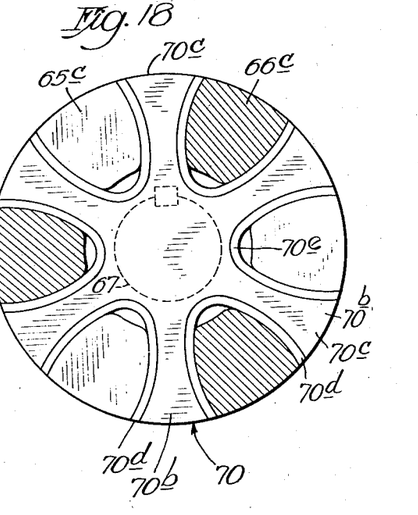
Fig. 18 shows a vertical section taken on the line 18—18 of Fig. 17.
Figure 19:
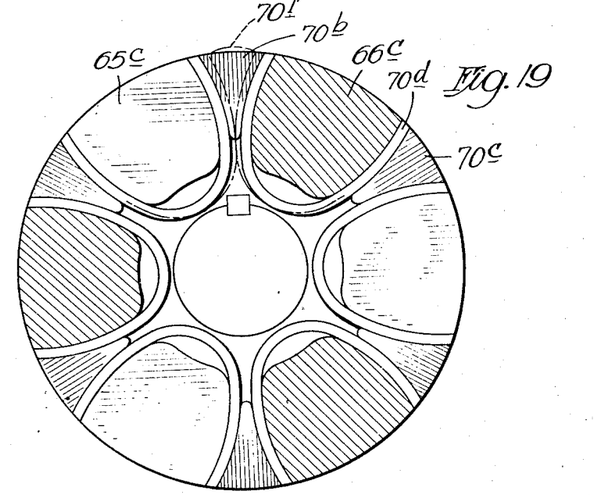
Fig. 19 is a sectional view similar to that of Fig. 18 showing the conditions of the parts when the spider arms are subjected to compression by the transmission of power through the coupling.

The form of the invention shown in Figs. 17, 18 and 19 of the drawings is similar in its general characteristics to the form of the invention shown in Figs. 8, 9, 10 and 11, except that the spider arms which form the power transmitting members are not under initial compression when there is no load on the coupling. In this form of the invention, the coupling is illustrated as comprising two coupling members 65 and 66 which are secured to a pair of substantially aligned shafts 67 and 68, respectively, by means of keys 69. These coupling members have hub portions 65a and 66a, respectively, which are formed integrally with radially extending disks 65b and 66b provided with integral longitudinally extending jaws 65c and 66c, respectively. These jaws intermesh loosely with each other and are adapted to receive between them power transmitting members 70c which are formed as the radiating arms of a power transmitting spider 70. The intermediate portions 70b of the spider arms 70c are formed as rubber members united with a central hub of the same material, and they are also united with the corresponding parts of adjacent arms 70c by outer laminations 70d which are vulcanized or otherwise secured to the intermediate laminations 70b. In this way, the adjacent arms 70c are connected with each other by these continuous integral members 70d extending between the adjacent spider arms. When the device is assembled, the looped portions 70e of the laminations 70d extend between the parts which engage the jaw faces and are located radially inward therefrom.

As illustrated, the arms 70c are constructed so that they increase gradually in thickness, measured circumferentially of the spider, from their inner ends outwardly, and they may be so proportioned as to cause substantially uniform stresses to be set up in all parts of each spider arm when the coupling is under load, as explained in certain of said prior patents mentioned above. The outer laminations 70d of the spider arms are hard and substantially incompressible and they may be formed preferably of layers of fabric united with each other by and impregnated with a synthetic resin or other equivalent material, as in the formation of the hard and substantially incompressible laminations described above.

The thickness of the spider arms measured circumferentially of the coupling is such that they may be readily inserted between the jaws of opposite coupling members without any additional compression, following the method of assembly which has heretofore been explained in connection with the form of construction shown in Figs. 8 to 11, inclusive. When thus assembled, the intermediate laminations 70ᵇ which are formed of relatively soft resilient and deformable material, such as rubber, are not initially deformed and assume their normal shapes. In the embodiment illustrated, the thickness of the spider arms, measured circumferentially, is such as to occupy all of the space between adjacent jaws of opposite coupling members when there is no load on the coupling. When a load is applied, the intermediate laminations 70ᵇ of alternate spider arms are compressed so that they bulge outwardly, as shown at 70ᶠ in Fig. 19. During this compression, these intermediate laminations act as columns with their end faces attached over their entire areas to the relatively hard and incompressible laminations 70ᵈ which, although substantially incompressible, should have sufficient flexibility to adjust themselves to the compression and deformation of the intermediate laminations 70ᵇ. In an extreme condition of the compression of the intermediate laminations 70ᵇ, the laminations 70ᵈ of adjacent spider arms will be moved substantially into contact with each other, thus preventing any further substantial compression of the spider arms.

In each form of the invention, there is attained the advantage of the use in each power transmitting member of one or more resilient deformable laminations which act as columns with their end faces attached to relatively hard and incompressible anchoring laminations so that the lateral bending or buckling of the resilient deformable laminations under compression is limited and the wear caused by tension due to buckling and by internal friction is substantially reduced. At the same time, these laminations have the quality of restricting frictional wear caused by their contact with the metallic jaws of the coupling members and they adjust themselves automatically to the load on the coupling so that, except in the cases of fluctuating and reversing loads, each power transmitting member normally maintains a contact with two opposite jaws carried by opposite coupling members. These advantages may be gained with or without the advantage of an initial compression of the power transmitting members when they are inserted between the jaws, which initial compression will then maintain the contact between the power transmitting members and the jaws even when the load is fluctuating or reversing in character. The improvements herein described are applicable to couplings having other forms of jaw surfaces and other forms of spiders or other power transmitting members such as those in which the opposite jaw engaging faces of each spider arm are parallel to each other or have some other relative arrangement not herein shown in detail.

The forms of the invention shown in Figs. 8 to 11ᵃ, inclusive, and in Figs. 12 to 14, inclusive, are claimed specifically in my copending divisional application Ser. No. 423,612, filed December 19, 1941.

Although several forms of the invention have been shown and described by way of illustration, it will be understood that it may be constructed in various other embodiments which come within the scope of the appended claims.

I claim:
1. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, each of said power transmitting members comprising a plurality of laminations bonded together to form a block, including an intermediate lamination formed of resilient deformable material, other laminations located on the outer sides of said intermediate lamination and formed of hard substantially non-deformable material, and other laminations formed of resilient deformable material and forming the outer sides of said block.

2. The combination in a coupling for connecting substantially aligned shafts and permitting relative endwise movement and relative angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, each of said power transmitting members being made up of a plurality of deformable and non-deformable laminations so bonded to each other as to produce a fixed anchorage of the deformable laminations over their power transmitting surfaces with the contacting non-deformable laminations, each of said power transmitting members being made up of a plurality of laminations including an intermediate lamination formed of resilient deformable material, other intermediate laminations formed of hard, substantially non-deformable material, and outer laminations formed of relatively thin layers of resilient deformable material.

3. A power transmitting member adapted to be interposed between relatively movable machine parts, comprising a plurality of laminations bonded together to form a block, an intermediate lamination being formed of resilient, deformable material, the other laminations being formed of hard, substantially non-deformable material and having their outer surfaces beveled at one end of the block.

4. A power transmitting member adapted to be interposed between relatively movable machine parts, comprising a plurality of laminations bonded together to form a block, an intermediate lamination being formed of resilient, deformable material, the other laminations being formed of hard, substantially non-deformable material and having their outer surfaces beveled at one end along both lateral edges of the block.

5. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, said power transmitting members being formed of laminations bonded together over the entire areas of their power transmitting surfaces, said laminations including intermediate laminations formed of resilient, deformable material and outer jaw-engaging laminations formed of hard, substantially non-deformable material, each power transmitting member being free to move bodily on the faces of the jaws with which it contacts.

6. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, said power transmitting members being formed of laminations including some laminations formed of rubber compounds bonded together over the entire areas of their power transmitting surfaces with other laminations formed of layers of fabric bonded together by a synthetic resin while under compression, each of said power transmitting member being free to move bodily on the surfaces of the jaws with which it contacts.

7. The combination in a coupling for connecting substantially aligned shafts, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, said power transmitting members being formed of laminations bonded together over the entire areas of their power transmitting surfaces, said laminations including intermediate laminations formed of resilient, deformable material and outer jaw-engaging laminations formed of hard, substantially incompressible material, said outer jaw-engaging laminations of each power transmitting member having opposite inwardly extending parts opposed to each other to limit the deformation of that power transmitting member.

8. The combination in a coupling for connecting substantially aligned shafts and permitting relative endwise movement and relative angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, each of said power transmitting members being made up of a plurality of deformable and non-deformable laminations bonded to each other as to produce a fixed anchorage of the deformable laminations over their power transmitting surfaces with the contacting non-deformable laminations, each of said power transmitting members being capable of moving bodily on the faces of the jaws with which it contacts.

9. The combination in a coupling for connecting substantially aligned shafts and permitting relative endwise movement and relative angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a plurality of power transmitting members each interposed between two jaws carried by opposite coupling members, each of said power transmitting members being made up of a plurality of deformable and non-deformable laminations bonded to each other as to produce a fixed anchorage of the deformable laminations over their power transmitting surfaces with the contacting non-deformable laminations, each of said power transmitting members being free to adjust its position bodily on the faces of the jaws with which it contacts, each of said power transmitting members being of greater normal thickness than the distance between opposite jaws engaged thereby so that the member is under compression when there is no load on the coupling.

LOUIS RICEFIELD.